(12) United States Patent
Notari et al.

(10) Patent No.: US 7,745,503 B2
(45) Date of Patent: Jun. 29, 2010

(54) USE OF DIALKYL CARBONATES AS SOLVENTS FOR EXPANDED POLYSTYRENE

(75) Inventors: Marcello Notari, Parma (IT); Franco Rivetti, Milan (IT)

(73) Assignee: Polimeri Europa S.p.A., Brindisi (IT)

( * ) Notice: Subject to any disclaimer, the term of this patent is extended or adjusted under 35 U.S.C. 154(b) by 518 days.

(21) Appl. No.: 10/566,401

(22) PCT Filed: Aug. 31, 2004

(86) PCT No.: PCT/EP2004/009684

§ 371 (c)(1),
(2), (4) Date: Jan. 30, 2006

(87) PCT Pub. No.: WO2005/023922

PCT Pub. Date: Mar. 17, 2005

(65) Prior Publication Data

US 2006/0241193 A1     Oct. 26, 2006

(30) Foreign Application Priority Data

Sep. 4, 2003   (IT)  .......................... MI2003A1704

(51) Int. Cl.
*C08J 11/04* (2006.01)
(52) U.S. Cl. .......................... 521/40; 521/47; 528/480; 528/491; 528/495
(58) Field of Classification Search ................... 521/48, 521/40, 40.5, 47, 79, 134, 50, 40.1, 41, 41.5, 521/48.5; 528/196, 271, 272, 480, 491, 495; 264/50, 53

See application file for complete search history.

(56) References Cited

U.S. PATENT DOCUMENTS

| 4,405,394 A | * | 9/1983 | Cohen .......................... 156/83 |
| 5,232,954 A | | 8/1993 | Peters |
| 5,532,023 A | * | 7/1996 | Vogel et al. .................... 427/8 |
| 5,629,352 A | * | 5/1997 | Shiino et al. ................ 521/40.5 |
| 6,169,121 B1 | * | 1/2001 | Noguchi et al. ................ 521/47 |
| 7,241,858 B2 | * | 7/2007 | Katz et al. ................... 528/480 |
| 7,321,003 B2 | * | 1/2008 | Katz et al. ................... 521/40.5 |
| 2005/0032917 A1 | * | 2/2005 | Katz et al. ................... 516/133 |
| 2006/0106121 A1 | * | 5/2006 | Seki et al. ................... 521/40.5 |

FOREIGN PATENT DOCUMENTS

| DE | 102 07 336 | | 5/2003 |
| DE | 102 07 336 A | * | 5/2003 |
| JP | 11 005865 | | 1/1999 |
| JP | 11 080418 | | 3/1999 |

* cited by examiner

*Primary Examiner*—Ling-Siu Choi
*Assistant Examiner*—Frances Tischler
(74) *Attorney, Agent, or Firm*—Oblon, Spivak, McClelland, Maier & Neustadt, L.L.P.

(57) ABSTRACT

The invention relates to the use of dialkyl carbonates as solvents for expanded polystyrene and to a new process for the recycling of expanded polystyrene. Said process comprises the volume reduction of expanded polystyrene by dissolution with a dialkyl carbonate, or a blend of dialkyl carbonates, the removal of the insoluble components by filtration, the selective precipitation of polystyrene with a non-solvent or a blend of non-solvents, the separation, drying and extrusion of the precipitated polystyrene. This process allows the recovery of pure polystyrene without altering its properties.

22 Claims, No Drawings

USE OF DIALKYL CARBONATES AS SOLVENTS FOR EXPANDED POLYSTYRENE

CROSS-REFERENCE TO RELATED APPLICATIONS

The present application is a 35 U.S.C. §371 National Stage patent application of International patent application PCT/EP04/009684, filed on Aug. 31, 2004, which claims priority to Italian patent application MI2003A001704, filed on Sep. 4, 2003.

FIELD OF THE INVENTION

The present invention relates to a new method for the recycling of expanded polystyrene.

The present invention relates to the use of dialkyl carbonates as solvents capable of reducing the volume of expanded polystyrene, and in particular to the use of dialkyl carbonates as solvents in a new method for the recycling of expanded polystyrene.

DISCUSSION OF THE BACKGROUND

Expanded polystyrene is used in large quantities as a packaging material of various products and as a thermal insulation material for the building industry and refrigerators, as a result of its characteristics of low thermal conductivity and good shock absorbance capacity. The waste deriving from these materials and the production scraps of expanded polystyrene are extremely bulky, as their specific weight is very low, and consequently their transportation and disposal in dumps create various problems. The disposal of these waste materials by incineration is also a problem, as it can interfere in the combustion process of the incineration oven and can also produce toxic gases. Some types of expanded polystyrene containing brominated flame-retardant additives, when incinerated, can in fact produce polybrominated dioxins, which are extremely toxic. For these reasons, the waste material from expanded polystyrene should be recycled, after a first step of volume reduction, effected in the production or waste collection sites, followed by the regeneration of the polystyrene, carried out in a centralized recovery plant.

The traditional methods for reducing the volume and the recycling of polystyrene, which envisage thermal treatment, do not allow the complete separation of polystyrene from the other products present in expanded polystyrene, and also have the great disadvantage of causing the partial oxidative degradation of the polymer, thus reducing its quality (Kano, Suzuki, J. Jpn. Pack. Inst., 31, 33, 1993; Sasao, Harade et Al., Kagaku Kogyo, 66, 395, 1992).

Another volume reduction method of expanded polystyrene described in the known art, which overcomes the above described drawbacks, is to dissolve the polymer in an organic solvent. Organic solvents which can appropriately dissolve polystyrene are aromatic hydrocarbons such as toluene and xylenes (U.S. Pat. No. 4,031,039) and halogenated solvents, such as methylene chloride, perchloro ethylene (U.S. Pat. No. 5,891,403). These solvents have the disadvantage of being flammable or dangerous for human beings and the environment. The use of solvents such as d-limonene has been proposed for overcoming these drawbacks (Noguchi, Miyashita, et al., Packag. Technol. Sci. 11, 19-27 (1998), which however has a strong smell of lemon and a low flash point (47° C.); glycol alkyl ethers, some of which are harmful or even toxic, such as diethylene glycol dimethyl ether; dialkyl esters of organic acids, such as dimethyl adipate, dimethyl glutarate and dimethyl succinate (U.S. Pat. No. 5,629,352). When the recovery of polystyrene from the solution is carried out by the evaporation of the solvent, the use of high boiling solvents, such as d-limonene, glycol dialkyl ethers and dialkyl esters of organic acids has the disadvantage of requiring, during the distillation phase of the solvent, very low pressures and the use of costly distillation equipment, in order to avoid the decomposition of polystyrene. In order to solve this problem, the recovery of polystyrene from the solution is effected, in U.S. Pat. No. 5,629,352, by means of precipitation by the addition of water. These methods, as also those which envisage the recovery of polystyrene by evaporation of the organic solvent, have the disadvantage of not allowing the separation from polystyrene of the majority of additives present in the expanded polystyrene, such as, for example, brominated flame-retardant additives, which are soluble in said organic solvents and insoluble in water. In the patent WO 0238659, the volume of the expanded polystyrene is reduced by treating it with a series of solvents consisting of a solvent capable of dissolving polystyrene, such as, for example, dialkyl esters of organic acids, and a non-solvent of the polymer, such as, for example, ethylene or propylene glycol and others. This treatment does not dissolve the expanded polystyrene but simply collapses it. The collapsed polystyrene, in gel form, is then separated and dried. Other methods similar to the previous one, which differ in the series of solvents and in the equipment used, are disclosed in patents WO 0222337, U.S. 2002/0120020. With these methods, the polystyrene, separated in gel form, withholds impurities and large amounts of solvent, which are difficult to remove during the drying phase.

The drawback of all these methods is that it is impossible to obtain pure polystyrene, without all the foreign components normally present in expanded polystyrene, such as labels, other polymers, additives and other materials. In patents EP 0894818 and WO 0214413, the recycling of the polymers in general with separation from foreign materials and additives is obtained by dissolving the polymeric material in a suitable solvent, by separating the insoluble components and recovering the desired polymer by precipitation with a non-solvent. These patents do not provide examples of the recycling of expanded polystyrene and the solvents used for dissolving the polymeric material are, for the most part, flammable, toxic or harmful.

It has now been found that the drawbacks of the known art can be overcome if a dialkyl carbonate is used as solvent for dissolving expanded polystyrene.

SUMMARY OF THE INVENTION

The present invention is directed to a process for recycling expanded polystyrene comprising:

volume reduction of expanded polystyrene by dissolution in a solution comprising a dialkyl carbonate, or a blend of dialkyl carbonates, having the following general formula (I):

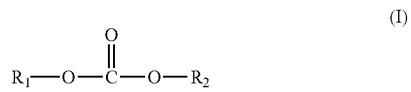

(I)

wherein $R_1$ and $R_2$ are the same or different and each independently represent a linear, a branched or a cyclic alkyl radical having from 1 to 12 carbon atoms, and the sum of the carbon atoms of $R_1$ and $R_2$ is from 2 to 15;

removal of an insoluble component, if present;

selective precipitation of polystyrene with a non-solvent, wherein said selective precipitation of polystyrene is carried out at a temperature of 10-70° C., wherein the non-solvent is an alkylene carbonate, or a blend of non-solvents consisting of an alcohol and an alkylene carbonate, and wherein a weight ratio of the non-solvent to the dialkyl carbonate is from 2:1 to 20:1;

separation of precipitated polystyrene; and drying of precipitated polystyrene.

DETAILED DESCRIPTION OF THE INVENTION

Preferred dialkyl carbonates are those having a flash point higher than 55° C., such as, for example, di-n-butyl carbonate (flash point=92° C.), di-isobutyl carbonate (flash point=84° C.), di-n-propyl carbonate (flash point =62° C.).

Exemplary dialkyl carbonates in accordance with the present invention are thermally stable solvents, with a particularly favorable toxicological and eco-toxicological profile, which allows their storage and application without any particular precautions. Dialkyl carbonates can be prepared by the transesterification of dimethyl carbonate with alcohols, using the known methods, as described, for example in Chem. Rev. 96, 95 1-976 (1996). Dimethyl carbonate can, in turn, be obtained by the oxidative carbonylation of methanol, as described in EP 460732.

Dialkyl carbonates are excellent solvents for expanded polystyrene and their solvent capacity decreases with an increase in the number of carbon atoms of the alkyl chains.

Low-boiling dialkyl carbonates, such as dimethyl carbonate (flash point=17° C.) and methyl ethyl carbonate, have a capacity of dissolving expanded polystyrene similar to that of the best solvents of the known art, such as methylene chloride, which is suspected to be cancerous; ethyl acetate, which has a lower flash point (−4° C.); butyl acetate, which has a higher toxicity and eco-toxicity; and toluene, which is harmful. Dialkyl carbonates with a higher boiling point and flash point (over 55° C.), such as, for example, di-n-propyl carbonate and di-n-butyl carbonate, have a solvent capacity with respect to polystyrene which is higher than that of alkyl di-esters of di-carboxylic acids, such as dimethyl succinate and dimethyl adipate and similar to that of limonene and di-ethylene glycol di-methyl ether, which is toxic.

The dissolution of expanded polystyrene with dialkyl carbonate is effected at atmospheric pressure, in an apparatus preferably equipped with a stirring system, at a temperature ranging from 20° C. to 70° C., preferably room temperature.

The polystyrene concentration in the solution is between 5% and 50% by weight, preferably within the range of 15% to 40% by weight.

The insoluble components, possibly present, are separated from the polystyrene solution in the dialkyl carbonate or the blend of dialkyl carbonates, through conventional solid/liquid separation procedures, such as, for example, decanting, filtration and centrifugation.

The selective recovery of polystyrene from the solution is effected by treatment with a non aqueous solvent, or blend of solvents, which are preferably miscible with dialkyl carbonate, characterized by being non-solvents for polystyrene and good solvents for the additives. Following this treatment, the polystyrene precipitates and the additives remain in solution.

Examples of solvents which can be used for the selective precipitation of polystyrene, are:

glycols, such as ethylene and propylene glycol; alcohols, such as n-butyl and iso-propyl alcohol; alkylene carbonates such as propylene carbonate, ethylene carbonate, butylene carbonate; dialkyl carbonates with a number of carbon atoms equal to or higher than 17, such as di-iso-octyl carbonate; alkyl esters of fatty acids.

Examples of additives which can be separated from the expanded polystyrene are brominated flame-retardant additives, such as for example hexabromocyclododecane (HBCD); coadjuvants of flame-retardant additives, such as for example dicumyl peroxide (DCP). These additives must be removed from the expanded polystyrene to avoid the formation of toxic gases, the degradation and colouring of the polymer during the subsequent extrusion phase.

The precipitation of the polystyrene is carried out at a temperature ranging from 10° C. to 70° C., preferably within the range of 15° C. to 60° C., by feeding the polystyrene solution to the non-solvent, maintained under turbulent stirring.

The quantity of non-solvent (or blend of non-solvents) used is in a weight ratio with the dialkyl carbonate ranging from 2:1 to 20:1, preferably within the range of 3:1 to 15:1.

The feeding of the polystyrene solution is effected on the bottom of the precipitation reactor, below the stirring system, with a flow-rate, expressed in g/(hour*liter of non-solvent), within the range of 30-1500, preferably within the range of 50-800.

The turbulent stirring during the precipitation phase of the polystyrene allows a finely subdivided precipitate to be obtained, avoiding the formation of gel and minimizing the inclusion of solvent and additives in the precipitate.

The polystyrene precipitate is separated by means of a physical method, such as decanting, centrifugation or filtration. This operation is carried out at a temperature ranging from 10° C. to 70° C., preferably within the range of 15° C. to 60° C.

In order to further reduce the content of additives and solvent (dialkyl carbonate) in the precipitate, the solid is washed using a non-solvent (or blend of non-solvents), preferably the non-solvent (or blend of non-solvents) used in the precipitation.

The washing is carried out at a temperature ranging from 10° C. to 80° C., preferably within the range of 15° C. to 70° C., by pouring the non-solvent (or blend of non-solvents) onto the filter containing the solid; or by suspending the solid in the non-solvent (or blend of non-solvents), leaving the suspension under stirring, for example for a time ranging from 0.1 to 24 hours and separating the solid by decanting, centrifugation or filtration; or with an extraction in continuous using an extractor, for example of the Soxhlet type. The quantity of non-solvent (or blend of non-solvents) used for the washing ranges from 1 liter to 30 liters per Kg of solid product, preferably within the range of 3 liters to 20 liters per Kg of solid product.

The polymer is dried at a temperature ranging from 50° C. to 180° C., preferably within the range of 80° C. to 150° C., and at a pressure ranging from 101 kPa to 0.1 kPa (760 mm Hg to 1 mm Hg), preferably within the range of 66.5 kPa to 1.3 kPa (500mm Hg to 10mm Hg).

The dried polymer is extruded with common extruders.

For the separation and recovery of the solvent (dialkyl carbonate), non-solvent and additives, the liquid coming from the filtration of polystyrene and the washing liquid are subjected to distillation using the conventional techniques. The additives remaining as distillation residue can be recovered.

The method described allows the recovery of polystyrene without altering its properties, as it enables the undesired additives to be separated from the polymer.

The following examples are provided for illustrative and non-limiting purposes of the present invention.

EXAMPLES 1-18

In these examples, the solubilization capacity of expanded polystyrene on the part of different dialkyl carbonates, was evaluated. This solvent capacity was compared with that of solvents whose use is described in the known art.

A cube of expanded polystyrene having a volume equal to 125 cm$^3$ (length=5 cm, width=5 cm, depth=5 cm) is immersed in a glass containing 20 ml of solvent, at room temperature, and the time necessary for completely dissolving the polystyrene is measured. The results of these tests are indicated in Table 1.

TABLE 1

| Example | Solvent | Solubilization time (seconds) |
|---|---|---|
| Ex. 1 | di-methyl carbonate | 45 |
| Ex. 2 | methyl-ethyl carbonate | 65 |
| Ex. 3 | di-ethyl carbonate | 110 |
| Ex. 4 | methyl-isopropyl carbonate | 115 |
| Ex. 5 | methyl-iso-butyl carbonate | 140 |
| Ex. 6 | di-n-propyl carbonate | 180 |
| Ex. 7 | methyl-iso-amyl carbonate | 190 |
| Ex. 8 | di-n-butyl carbonate | 290 |
| Ex. 9 | di-iso-amyl carbonate | 1200 |
| Ex. 10 | butyl-iso-octyl carbonate | 1980 |
| Comp. ex. 11 | methylene chloride | 30 |
| Comp. ex. 12 | ethyl acetate | 35 |
| Comp. ex. 13 | toluene | 45 |
| Comp. ex. 14 | butyl acetate | 60 |
| Comp. ex. 15 | diethylene glycol dimethylether | 165 |
| Comp. ex. 16 | limonene | 290 |
| Comp. ex. 17 | dimethyl succinate | 440 |
| Comp. ex. 18 | dimethyl adipate | 580 |

As is clearly indicated in Table 1, the dialkyl carbonates (Examples 1-10) generally have a good capacity for dissolving expanded polystyrene. This capacity decreases, in the series of dialkyl carbonates, with an increase in the number of carbon atoms in the alkyl chains. Low-boiling dialkyl carbonates, such as for example dimethyl carbonate (Example 1) (flash point=17° C.) and methyl-ethyl carbonate (Example 2) have a capacity of dissolving polystyrene similar to that of the best solvents in the known art, such as methylene chloride (Comparative example 11), which is suspected to be cancerous; ethyl acetate (Comparative example 12), which has a lower flash point (−4° C.); butyl acetate (Comparative example 14), which has a greater toxicity and eco-toxicity; toluene (Comparative example 13), which is harmful. High boiling dialkyl carbonates and with a higher flash point (over 5.5° C.), such as for example di-n-propyl carbonate (Example 6) and dibutyl carbonate (Example 8) have a solvent capacity with respect to polystyrene which is greater than that of alkyl diesters of dicarboxylic acids, such as dimethyl succinate (Comparative example 17) and dimethyl adipate (Comparative example 18) and similar to that of limonene (Comparative example 16) and diethyleneglycol dimethylether (Comparative example 15), which is toxic.

EXAMPLE 19

Preparation of the Polystyrene Solution 210 g of di-n-butyl carbonate are charged into a glass container having a volume of 0.5 liters, equipped with a blade stirrer, thermometer, bottom discharge outlet and inlet for the addition of material. 90 g of expanded polystyrene reduced to pieces are added in portions to the di-n-butyl carbonate, maintained under stirring at room temperature, and the mixture is left under stirring until complete dissolution. The solution obtained, containing 30% by weight of polystyrene, is filtered in order to eliminate insoluble foreign substances.

The expanded polystyrene used in this and in the subsequent examples is of the flame-retardant type, characterized by a weight average molecular weight equal to 188,000, a bromine content equal to 0.51% by weight and a content of dicumyl peroxide equal to 0.16% by weight.

EXAMPLE 20

Precipitation and Recovery of the Polystyrene

The equipment used for the precipitation of the polystyrene consists of a jacketed glass reactor, having a volume of 1 liter, equipped with a water condenser, thermometer, bottom discharge outlet, Ultra-Turrax stirrer-homogenizer and a feeding plunged piped, having such a form and dimensions that the polystyrene solution is fed below to the stirring system.

350 g of n-butanol maintained at a temperature of about 25° C. by the circulation of tap water in the reactor jacket, are charged into the reactor described above. The stirring is activated (4,000 revs/minute) and 50 g of the polystyrene solution (30% by weight in di-n-butyl carbonate), prepared in example 19, are fed from the plunged pipe, by means of a gear pump, with a flow-rate of 100 g/hour.

During this phase, the polystyrene precipitates. At the end of the feeding of polymer solution, the solid formed is filtered. The filtered liquid, having a weight of 381 g, has the following composition:

8.4% by weight of di-n-butyl carbonate, 91.6% by weight of butanol, 98 mg/kg of bromine and 55 mg/kg of dicumyl peroxide.

The solid on the filter is washed, at room temperature, with 100 g of butanol. The washing liquid, having a weight of 102.2 g, has the following composition:

1.65% by weight of dibutyl carbonate, 98.35% by weight of butanol, 98 mg/kg of bromine and 9.8 mg/kg of dicumyl peroxide.

The filtration liquid and the washing liquid are distilled in order to recover the butanol and dibutyl carbonate. The bromine and dicumyl peroxide remain in the distillation bottom.

The solid on the filter, having a weight of 16.7 g has the following composition:

89% by weight of polystyrene, 3% by weight of butanol, 7.8% by weight of dibutyl carbonate, 0.18% by weight of bromine and 0.012% by weight of dicumyl peroxide.

The solid, after drying in an oven for a period of 8 hours at a temperature of 140° C. and a pressure of about 50 mm Hg, has a weight of 14.9 g and the following composition:

99.8% by weight of polystyrene, 0.02% by weight of dibutyl carbonate, 0.2% by weight of bromine, and 0.013% by weight of dicumyl peroxide.

The content of bromine and dicumyl peroxide in the polystyrene recovered were reduced by 61% and 92% respectively with respect to the starting expanded polystyrene.

The polystyrene recovered is white and has a weight average molecular weight, determined by means of GPC, the same as that of the starting polystyrene.

EXAMPLE 21

350 g of n-butanol are charged into the reactor described in example 3, and are maintained at a temperature of about 55°

C. by circulation of ethylene glycol in the reactor jacket, heated by a thermostatic bath. The stirring is activated (4000 revs/min) and 50 g of the polystyrene solution (30% by weight in di-n-butyl carbonate) prepared in example 19, are fed from the plunged pipe by means of a gear pump with a flow-rate of 100 g/hour.

During this phase, the polystyrene precipitates. Once the feeding of the polymer solution has been completed, the solid formed is decanted and the liquid is separated by suction with a vacuum membrane pump, through a flexible Teflon tube, equipped at one end with a filtration septum. The liquid separated, having a weight of 347.4 g, has the following composition:

7.2% by weight of di-n-butyl carbonate, 92.8% by weight of butanol, 127 mg/Kg of bromine and 52 mg/Kg of dicumyl peroxide.

The solid remaining in the reactor, having a weight of 52.5 g, has the following composition:

28.4% by weight of polystyrene, 52.2% by weight of butanol, 19.4% by weight of dibutyl carbonate, 62.5 mg/Kg of bromine and 115 mg/Kg of dicumyl peroxide.

The solid is washed in the reactor by suspending it in 200 g of n-butanol and leaving the suspension under stirring (4000 revs/min) at room temperature for 45 minutes. At the end of the washing operation the solid is filtered. The washing liquid, having a weight of 234 g, has the following composition:

3.8% by weight of dibutyl carbonate, 96.2% by weight of butanol, 85 mg/Kg of bromine and 23 mg/Kg of dicumyl peroxide.

The filtration liquid and the washing liquid are distilled in order to recover butanol and dibutyl carbonate. Bromine and dicumyl peroxide remain in the distillation bottom.

The solid product on the filter, having a weight of 18.5 g, has the following composition:

80.5% by weight of polystyrene, 12.4% by weight of butanol, 7% by weight of dibutyl carbonate, 690 mg/Kg of bromine and 42 mg/Kg of dicumyl peroxide.

The solid, after drying in an oven for 2 hours at a temperature of 140° C. and a pressure of about 6.6 kPa (50 mmHg), has a weight of 15 g and the following composition: 99.75% by weight of polystyrene, 0.01% by weight of dibutyl carbonate, 0.04% by weight of butanol, 860 mg/Kg of bromine and 51 mg/Kg of dicumyl peroxide.

The content of bromine and dicumyl peroxide in the recovered polystyrene were reduced by 83.2% and 96.8%, respectively, with respect to the starting expanded polystyrene. The recovered polystyrene is white and has a weight average molecular weight, determined by GPC, equal to that of the starting polystyrene.

EXAMPLE 22

210 g of n-butanol and 210 g of propylene carbonate, are charged into the reactor described in example 3 and are maintained at a temperature of about 25° C. by circulation of tap water in the reactor jacket. The stirring is activated (4000 revs/minute) and 70 g of the polystyrene solution (30% by weight in di-n-butyl carbonate), prepared in example 19, are fed from the plunged pipe, by means of a gear pump, with a flow-rate of 100 g/hour.

During this phase, the polystyrene precipitates. Once the feeding of the polymer solution has been completed, the solid formed is decanted and the liquid is separated by suction with a vacuum membrane pump, through a flexible Teflon tube, equipped at one end with a filtration septum. The liquid separated, having a weight of 430.4 g, has the following composition:

10.2% by weight of di-n-butyl carbonate, 45.2% by weight of butanol, 44.6% by weight of propylene carbonate, 216 mg/Kg of bromine and 69 mg/Kg of dicumyl peroxide.

The solid remaining in the reactor, having a weight of 59.6 g, has the following composition:

35% by weight of polystyrene, 25.7% by weight of butanol, 30.3% by weight of propylene carbonate, 8.9% by weight of dibutyl carbonate, 230 mg/Kg of bromine and 70 mg/Kg of dicumyl peroxide.

The solid is washed in the reactor by suspending it in 200 g of n-butanol and leaving the suspension under stirring (4000 revs/min) at room temperature for 45 minutes. At the end of the washing operation the solid is filtered. The washing liquid, having a weight of 233.6 g, has the following composition:

2.1% by weight of dibutyl carbonate, 91% by weight of butanol, 6.9% by weight of propylene carbonate, 34 mg/Kg of bromine and 15 mg/Kg of dicumyl peroxide.

The filtration liquid and the washing liquid are distilled in order to recover butanol and dibutyl carbonate. Bromine and dicumyl peroxide remain in the distillation bottom.

The solid product on the filter, having a weight of 26 g, has the following composition:

80.2% by weight of polystyrene, 10.7% by weight of butanol, 7.3% by weight of propylene carbonate, 1.8% by weight of dibutyl carbonate, 240 mg/Kg of bromine and 22 mg/Kg of dicumyl peroxide.

The solid, after drying in an oven for 2 hours at a temperature of 140° C. and a pressure of about 6.6 kPa (50 mmHg), has a weight of 20.9 g and the following composition: 99.85% by weight of polystyrene, 0.05% by weight of dibutyl carbonate, 0.04% by weight of propylene carbonate, 0.01% by weight of butanol, 290 mg/Kg of bromine and 28 mg/Kg of dicumyl peroxide.

The content of bromine and dicumyl peroxide in the recovered polystyrene were reduced by 94.1% and 98.3%, respectively, with respect to the starting expanded polystyrene. The recovered polystyrene has a weight average molecular weight, determined by GPC, equal to that of the starting polystyrene.

The invention claimed is:

1. A process for recycling expanded polystyrene comprising:
    volume reduction of expanded polystyrene by dissolution in a solution comprising a dialkyl carbonate, or a blend of dialkyl carbonates, having the following general formula (I):

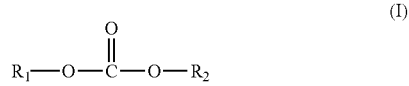

wherein $R_1$ and $R_2$ are the same or different and each independently represent a linear, a branched or a cyclic alkyl radical having from 1 to 12 carbon atoms, and the sum of the carbon atoms of $R_1$ and $R_2$ is from 2 to 15;
    removal of an insoluble component, if present;
    selective precipitation of polystyrene with a non-solvent, wherein said selective precipitation of polystyrene is carried out at a temperature of 10-70° C., wherein the non-solvent is an alkylene carbonate, or a blend of non-solvents consisting of an alcohol and an alkylene carbonate in a weight ratio of 1:1, and wherein a weight ratio of the non-solvent to the dialkyl carbonate is from 2:1 to 20:1;

separation of precipitated polystyrene; and drying of precipitated polystyrene.

2. The process according to claim 1, wherein $R_1$ and $R_2$ each independently represent a linear or a branched alkyl radical having from 1 to 8 carbon atoms, and the sum of the carbon atoms of $R_1$ and $R_2$ is from 5 to 10.

3. The process according to claim 2, wherein the dialkyl carbonate, or blend thereof, is selected from dialkyl carbonates having a flash point higher than 55° C.

4. The process according to claim 1, wherein the dialkyl carbonate, or blend thereof, is selected from dialkyl carbonates having a flash point higher than 55° C.

5. The process according to claim 1, wherein the dialkyl carbonates are selected from the group consisting of di-n-butyl carbonate, di-iso-butyl carbonate and di-n-propyl carbonate.

6. The process according to claim 1, wherein said dissolution is carried out under atmospheric pressure at a temperature of 20-70° C. with optional stirring, and the concentration of expanded polystyrene in the solution is 5-50 wt. %.

7. The process according to claim 1, wherein said dissolution is carried out under atmospheric pressure at room temperature with stirring, and the concentration of expanded polystyrene in the solution is 15-40 wt. %.

8. The process according to claim 1, wherein the insoluble component is present and said removal thereof from the solution is carried out by decanting, filtration or centrifugation.

9. The process according to claim 1, wherein said selective precipitation of polystyrene is carried out by feeding the solution to the non-solvent under stirring.

10. The process according to claim 9, wherein said selective precipitation of polystyrene is carried out by feeding the solution into a bottom portion of a precipitation reactor below a stirring system.

11. The process according to claim 9, wherein said selective precipitation of polystyrene is carried out by feeding the solution to the non-solvent at a flow rate of 30-1,500 g of solution per hour per liter of non-solvent.

12. The process according to claim 9, wherein said selective precipitation of polystyrene is carried out by feeding the solution to the non-solvent at a flow rate of 50-800 g of solution per hour per liter of non-solvent.

13. The process according to claim 1, wherein said selective precipitation of polystyrene is carried out at a temperature of 15-60° C.

14. The process according to claim 1, wherein said selective precipitation of polystyrene is carried out with a weight ratio of the non-solvent to the dialkyl carbonate of 3-15:1.

15. The process according to claim 1, wherein the non-solvent is an alkylene carbonate selected from the group consisting of propylene carbonate, ethylene carbonate and butylene carbonate.

16. The process according to claim 1, wherein the non-solvent is a blend of non-solvents consisting of an alcohol and an alkylene carbonate in a weight ratio of 1:1 , wherein the alcohol is one or more alcohols selected from the group consisting of n-butyl alcohol and iso-propyl alcohol, and the alkylene carbonate is one or more alkylene carbonates selected from the group consisting of propylene carbonate, ethylene carbonate and butylene carbonate.

17. The process according to claim 1, wherein said separation of precipitated polystyrene is carried out by decanting, filtration or centrifugation, at a temperature of 10-70° C.

18. The process according to claim 1, wherein said separation of precipitated polystyrene is carried out by decanting, filtration or centrifugation, at a temperature of 15-60° C.

19. The process according to claim 1, wherein said process further comprises, after said separation and before said drying of precipitated polystyrene, washing of precipitated polystyrene at a temperature of 10-80° C. with a method selected from the group consisting of:

pouring the non-solvent onto a filter comprising precipitated polystyrene;

suspending precipitated polystyrene in the non-solvent under stirring; and continuous extraction of precipitated polystyrene with the non-solvent.

20. The process according to claim 1, wherein said drying of precipitated polystyrene is carried out at a temperature of 50-180° C. under a pressure of 1-760 mm Hg.

21. The process according to claim 1, wherein said drying of precipitated polystyrene is carried out at a temperature of 80-150° C. under a pressure of 10-500 mm Hg.

22. The process according to claim 1, wherein said process further comprises, after said drying of precipitated polystyrene, extrusion of precipitated polystyrene.

* * * * *